US010700892B2

(12) United States Patent
Liu et al.

(10) Patent No.: US 10,700,892 B2
(45) Date of Patent: Jun. 30, 2020

(54) PREDICTIVE ROAMING BETWEEN SUBNETS

(71) Applicant: Extreme Networks, Inc., San Jose, CA (US)

(72) Inventors: Changming Liu, Cupertino, CA (US); Yong Kang, Palo Alto, CA (US); Jianlin Zeng, San Jose, CA (US); Sreekanth Reddy, Edison, NJ (US)

(73) Assignee: Extreme Networks Inc., San Jose, CA (US)

( * ) Notice: Subject to any disclaimer, the term of this patent is extended or adjusted under 35 U.S.C. 154(b) by 0 days.

(21) Appl. No.: 16/056,489

(22) Filed: Aug. 6, 2018

(65) Prior Publication Data

US 2018/0343145 A1     Nov. 29, 2018

Related U.S. Application Data

(63) Continuation of application No. 15/412,949, filed on Jan. 23, 2017, now Pat. No. 10,064,105, which is a
(Continued)

(51) Int. Cl.
*H04W 4/00* (2018.01)
*H04L 12/46* (2006.01)
(Continued)

(52) U.S. Cl.
CPC .......... *H04L 12/4633* (2013.01); *H04W 8/02* (2013.01); *H04W 8/087* (2013.01); *H04W 8/18* (2013.01);
(Continued)

(58) Field of Classification Search
None
See application file for complete search history.

(56) References Cited

U.S. PATENT DOCUMENTS

| 5,471,671 A | 11/1995 | Wang |
| 5,697,059 A | 12/1997 | Carney |

(Continued)

FOREIGN PATENT DOCUMENTS

| CN | 1642143 | 7/2005 |
| EP | 0940999 | 9/1999 |

(Continued)

OTHER PUBLICATIONS

Chirumamilla, Mohan K. et al., "Agent Based Intrustion Detection and Response System for Wireless LANs," CSE Conference and Workshop Papers, Paper 64, Jan. 1, 2003.
(Continued)

*Primary Examiner* — Elisabeth Benoit Magloire
(74) *Attorney, Agent, or Firm* — Sterne, Kessler, Goldstein & Fox P.L.L.C.

(57) ABSTRACT

A network device of a subnet determines predictive roaming information for a wireless client. Predictive roaming information can identify the wireless client and a home network subnet of the wireless client. The network device provides predictive roaming information associated with a wireless client to neighboring subnets. Neighboring subnets store received predictive roaming information, and use the predictive roaming information if the wireless client roams to them.

20 Claims, 8 Drawing Sheets

Related U.S. Application Data continuation of application No. 14/686,665, filed on Apr. 14, 2015, now Pat. No. 9,590,822, which is a continuation of application No. 14/139,819, filed on Dec. 23, 2013, now Pat. No. 9,025,566, which is a continuation of application No. 13/452,437, filed on Apr. 20, 2012, now Pat. No. 8,614,989, which is a continuation of application No. 12/120,338, filed on May 14, 2008, now Pat. No. 8,218,502.

(51) Int. Cl.

| | | |
|---|---|---|
| *H04W 76/22* | (2018.01) | |
| *H04W 76/12* | (2018.01) | |
| *H04W 8/26* | (2009.01) | |
| *H04W 88/08* | (2009.01) | |
| *H04W 36/00* | (2009.01) | |
| *H04W 8/02* | (2009.01) | |
| *H04W 12/04* | (2009.01) | |
| *H04W 36/08* | (2009.01) | |
| *H04W 36/24* | (2009.01) | |
| *H04W 8/08* | (2009.01) | |
| *H04W 8/18* | (2009.01) | |
| *H04L 29/06* | (2006.01) | |
| *H04W 8/00* | (2009.01) | |
| *H04W 28/08* | (2009.01) | |
| *H04W 48/16* | (2009.01) | |
| *H04W 84/12* | (2009.01) | |

(52) U.S. Cl.
CPC ............ *H04W 8/26* (2013.01); *H04W 12/04* (2013.01); *H04W 36/0011* (2013.01); *H04W 36/0016* (2013.01); *H04W 36/0061* (2013.01); *H04W 36/0066* (2013.01); *H04W 36/08* (2013.01); *H04W 36/245* (2013.01); *H04W 76/12* (2018.02); *H04W 76/22* (2018.02); *H04W 88/08* (2013.01); *H04L 63/0876* (2013.01); *H04W 8/005* (2013.01); *H04W 28/08* (2013.01); *H04W 48/16* (2013.01); *H04W 84/12* (2013.01)

(56) References Cited

U.S. PATENT DOCUMENTS

| | | |
|---|---|---|
| 5,726,984 A | 3/1998 | Kubler |
| 5,956,643 A | 9/1999 | Benveniste |
| 6,061,799 A | 5/2000 | Eldridge |
| 6,112,092 A | 8/2000 | Benveniste |
| 6,154,655 A | 11/2000 | Borst |
| 6,201,792 B1 | 3/2001 | Lahat |
| 6,233,222 B1 | 5/2001 | Wallentin |
| 6,314,294 B1 | 11/2001 | Benveniste |
| 6,473,413 B1 | 10/2002 | Chiou |
| 6,496,699 B2 | 12/2002 | Benveniste |
| 6,519,461 B1 | 2/2003 | Andersson |
| 6,628,623 B1 | 9/2003 | Noy |
| 6,628,938 B1 | 9/2003 | Rachabathuni |
| 6,636,498 B1 | 10/2003 | Leung |
| 6,701,361 B1 * | 3/2004 | Meier ............... H04L 29/12009 370/338 |
| 6,775,549 B2 | 8/2004 | Benveniste |
| 6,865,393 B1 | 3/2005 | Baum |
| 6,957,067 B1 | 10/2005 | Iyer |
| 7,002,943 B2 | 2/2006 | Bhagwat |
| 7,057,566 B2 | 6/2006 | Theobold |
| 7,085,224 B1 | 8/2006 | Oran |
| 7,085,241 B1 | 8/2006 | O'Neill |
| 7,130,629 B1 | 10/2006 | Leung |
| 7,154,874 B2 | 12/2006 | Bhagwat |
| 7,164,667 B2 | 1/2007 | Rayment |
| 7,174,170 B2 | 2/2007 | Steer |
| 7,177,646 B2 | 2/2007 | O'Neill |
| 7,181,530 B1 | 2/2007 | Halasz |
| 7,216,365 B2 | 5/2007 | Bhagwat |
| 7,224,697 B2 | 5/2007 | Banerjea |
| 7,251,238 B2 | 7/2007 | Joshi |
| 7,336,670 B1 | 2/2008 | Calhoun |
| 7,339,914 B2 | 3/2008 | Bhagwat |
| 7,346,338 B1 | 3/2008 | Calhoun |
| 7,366,894 B1 | 4/2008 | Kalimuthu |
| 7,369,489 B1 | 5/2008 | Bhattacharya |
| 7,370,362 B2 | 5/2008 | Olson |
| 7,440,434 B2 | 10/2008 | Chaskar |
| 7,512,379 B2 | 3/2009 | Nguyen |
| 7,536,723 B1 | 5/2009 | Bhagwat |
| 7,562,384 B1 | 7/2009 | Huang |
| 7,593,356 B1 | 9/2009 | Friday |
| 7,656,822 B1 | 2/2010 | AbdelAziz |
| 7,706,789 B2 | 4/2010 | Qi |
| 7,716,370 B1 | 5/2010 | Devarapalli |
| 7,751,393 B2 | 7/2010 | Chaskar |
| 7,768,952 B2 | 8/2010 | Lee |
| 7,793,104 B2 | 9/2010 | Zheng |
| 7,804,808 B2 | 9/2010 | Bhagwat |
| 7,843,907 B1 | 11/2010 | Abou-Emara |
| 7,844,057 B2 | 11/2010 | Meier |
| 7,856,209 B1 | 12/2010 | Rawat |
| 7,921,185 B2 | 4/2011 | Chawla |
| 7,949,342 B2 | 5/2011 | Cuffaro |
| 7,961,725 B2 | 6/2011 | Nagarajan |
| 7,970,894 B1 | 6/2011 | Patwardhan |
| 8,000,308 B2 | 8/2011 | Dietrich |
| 8,069,483 B1 | 11/2011 | Matlock |
| 8,219,688 B2 | 7/2012 | Wang |
| 8,249,606 B1 | 8/2012 | Neophytou |
| 8,493,918 B2 | 7/2013 | Karaoguz |
| 8,553,612 B2 | 10/2013 | Alexandre |
| 8,789,191 B2 | 7/2014 | Bhagwat |
| 8,824,448 B1 | 9/2014 | Narayana |
| 8,948,046 B2 | 2/2015 | Kang |
| 8,953,453 B1 | 2/2015 | Xiao |
| 9,003,527 B2 | 4/2015 | Bhagwat |
| 2001/0006508 A1 | 7/2001 | Pankaj |
| 2002/0012320 A1 | 1/2002 | Ogier |
| 2002/0021689 A1 | 2/2002 | Robbins |
| 2002/0041566 A1 | 4/2002 | Yang |
| 2002/0071422 A1 | 6/2002 | Amicangioli |
| 2002/0091813 A1 | 7/2002 | Lamberton |
| 2002/0114303 A1 | 8/2002 | Crosbie |
| 2002/0116463 A1 | 8/2002 | Hart |
| 2002/0128984 A1 | 9/2002 | Mehta |
| 2003/0005100 A1 | 1/2003 | Barnard |
| 2003/0039212 A1 | 2/2003 | Lloyd |
| 2003/0084104 A1 | 5/2003 | Salem |
| 2003/0087629 A1 | 5/2003 | Juitt |
| 2003/0104814 A1 | 6/2003 | Gwon |
| 2003/0129988 A1 | 7/2003 | Lee |
| 2003/0145091 A1 | 7/2003 | Peng |
| 2003/0179742 A1 | 9/2003 | Ogier |
| 2003/0198207 A1 | 10/2003 | Lee |
| 2004/0003285 A1 | 1/2004 | Whelan |
| 2004/0013118 A1 | 1/2004 | Borella |
| 2004/0022222 A1 | 2/2004 | Clisham |
| 2004/0054774 A1 | 3/2004 | Barber |
| 2004/0064467 A1 | 4/2004 | Kola |
| 2004/0077341 A1 | 4/2004 | Chandranmenon |
| 2004/0103282 A1 | 5/2004 | Meier |
| 2004/0109466 A1 | 6/2004 | Van Ackere |
| 2004/0162037 A1 | 8/2004 | Shpak |
| 2004/0185876 A1 | 9/2004 | Groenendaal |
| 2004/0192312 A1 | 9/2004 | Li |
| 2004/0196977 A1 | 10/2004 | Johnson |
| 2004/0221042 A1 * | 11/2004 | Meier ................. H04L 12/4625 709/227 |
| 2004/0236939 A1 | 11/2004 | Watanabe |
| 2004/0255028 A1 | 12/2004 | Chu |
| 2005/0053003 A1 | 3/2005 | Cain |
| 2005/0074015 A1 | 4/2005 | Chari |
| 2005/0085235 A1 | 4/2005 | Park |

(56) References Cited

U.S. PATENT DOCUMENTS

| | | | |
|---|---|---|---|
| 2005/0089041 A1* | 4/2005 | Idnani | H04L 45/742 |
| | | | 370/395.5 |
| 2005/0094606 A1* | 5/2005 | Adrangi | H04L 29/12311 |
| | | | 370/338 |
| 2005/0099983 A1 | 5/2005 | Nakamura | |
| 2005/0122946 A1 | 6/2005 | Won | |
| 2005/0154774 A1 | 7/2005 | Giaffreda | |
| 2005/0207417 A1 | 9/2005 | Ogawa | |
| 2005/0259682 A1 | 11/2005 | Yosef | |
| 2005/0262266 A1 | 11/2005 | Wiberg | |
| 2005/0265288 A1 | 12/2005 | Liu | |
| 2005/0266848 A1 | 12/2005 | Kim | |
| 2006/0010250 A1 | 1/2006 | Eisl | |
| 2006/0013179 A1 | 1/2006 | Yamane | |
| 2006/0026289 A1 | 2/2006 | Lyndersay | |
| 2006/0062250 A1 | 3/2006 | Payne, III | |
| 2006/0107050 A1 | 5/2006 | Shih | |
| 2006/0117018 A1 | 6/2006 | Christiansen | |
| 2006/0140123 A1 | 6/2006 | Conner | |
| 2006/0146748 A1 | 7/2006 | Ng | |
| 2006/0146846 A1 | 7/2006 | Yarvis | |
| 2006/0165015 A1 | 7/2006 | Melick | |
| 2006/0187949 A1 | 8/2006 | Seshan | |
| 2006/0221920 A1 | 10/2006 | Gopalakrishnan | |
| 2006/0233128 A1 | 10/2006 | Sood | |
| 2006/0234701 A1 | 10/2006 | Wang | |
| 2006/0245442 A1 | 11/2006 | Srikrishna | |
| 2006/0251256 A1 | 11/2006 | Asokan | |
| 2006/0268802 A1 | 11/2006 | Faccin | |
| 2006/0294246 A1* | 12/2006 | Stieglitz | H04W 8/00 |
| | | | 709/228 |
| 2007/0004394 A1 | 1/2007 | Chu | |
| 2007/0010231 A1 | 1/2007 | Du | |
| 2007/0025274 A1 | 2/2007 | Rahman | |
| 2007/0025298 A1* | 2/2007 | Jung | H04W 8/12 |
| | | | 370/331 |
| 2007/0030826 A1 | 2/2007 | Zhang | |
| 2007/0049323 A1 | 3/2007 | Wang | |
| 2007/0077937 A1 | 4/2007 | Ramakrishnan | |
| 2007/0078663 A1 | 4/2007 | Grace | |
| 2007/0082656 A1 | 4/2007 | Stieglitz | |
| 2007/0087756 A1 | 4/2007 | Hoffberg | |
| 2007/0091859 A1 | 4/2007 | Sethi | |
| 2007/0115847 A1 | 5/2007 | Strutt | |
| 2007/0116011 A1 | 5/2007 | Lim | |
| 2007/0121947 A1 | 5/2007 | Sood | |
| 2007/0133407 A1 | 6/2007 | Choi | |
| 2007/0140191 A1 | 6/2007 | Kojima | |
| 2007/0150720 A1 | 6/2007 | Oh | |
| 2007/0153697 A1 | 7/2007 | Kwan | |
| 2007/0153741 A1 | 7/2007 | Blanchette | |
| 2007/0156804 A1 | 7/2007 | Mo | |
| 2007/0160017 A1 | 7/2007 | Meier | |
| 2007/0171885 A1 | 7/2007 | Bhagwat | |
| 2007/0192862 A1 | 8/2007 | Vermeulen | |
| 2007/0195761 A1 | 8/2007 | Tatar | |
| 2007/0206552 A1 | 9/2007 | Yaqub | |
| 2007/0247303 A1 | 10/2007 | Payton | |
| 2007/0248014 A1 | 10/2007 | Xie | |
| 2007/0249324 A1 | 10/2007 | Jou | |
| 2007/0263532 A1 | 11/2007 | Mirtorabi | |
| 2007/0280481 A1 | 12/2007 | Eastlake | |
| 2007/0288997 A1 | 12/2007 | Meier | |
| 2008/0002642 A1 | 1/2008 | Borkar | |
| 2008/0022392 A1 | 1/2008 | Karpati | |
| 2008/0037552 A1 | 2/2008 | Dos Remedios | |
| 2008/0080369 A1 | 4/2008 | Sumioka | |
| 2008/0080377 A1 | 4/2008 | Sasaki | |
| 2008/0090575 A1 | 4/2008 | Barak | |
| 2008/0095094 A1 | 4/2008 | Innami | |
| 2008/0095163 A1 | 4/2008 | Chen | |
| 2008/0107027 A1 | 5/2008 | Allan | |
| 2008/0109879 A1 | 5/2008 | Bhagwat | |
| 2008/0130495 A1 | 6/2008 | Dos Remedios | |
| 2008/0146240 A1 | 6/2008 | Trudeau | |
| 2008/0151751 A1 | 6/2008 | Ponnuswamy | |
| 2008/0159128 A1 | 7/2008 | Shaffer | |
| 2008/0159135 A1 | 7/2008 | Caram | |
| 2008/0170527 A1 | 7/2008 | Lundsgaard | |
| 2008/0186932 A1 | 8/2008 | Do | |
| 2008/0194271 A1 | 8/2008 | Bedekar | |
| 2008/0207215 A1 | 8/2008 | Chu | |
| 2008/0209186 A1 | 8/2008 | Boden | |
| 2008/0212562 A1 | 9/2008 | Bedekar | |
| 2008/0219286 A1 | 9/2008 | Ji | |
| 2008/0225857 A1 | 9/2008 | Lange | |
| 2008/0229095 A1 | 9/2008 | Kalimuthu | |
| 2008/0240128 A1 | 10/2008 | Elrod | |
| 2008/0253370 A1 | 10/2008 | Cremin | |
| 2008/0273520 A1 | 11/2008 | Kim | |
| 2008/0279161 A1 | 11/2008 | Stirbu | |
| 2009/0019521 A1 | 1/2009 | Vasudevan | |
| 2009/0028052 A1 | 1/2009 | Strater | |
| 2009/0040989 A1 | 2/2009 | da Costa | |
| 2009/0043901 A1 | 2/2009 | Mizikovsky | |
| 2009/0082025 A1 | 3/2009 | Song | |
| 2009/0088152 A1 | 4/2009 | Orlassino | |
| 2009/0097436 A1 | 4/2009 | Vasudevan | |
| 2009/0111468 A1 | 4/2009 | Burgess | |
| 2009/0113018 A1 | 4/2009 | Thomson | |
| 2009/0141692 A1 | 6/2009 | Kasslin | |
| 2009/0144740 A1 | 6/2009 | Gao | |
| 2009/0168645 A1 | 7/2009 | Tester | |
| 2009/0172151 A1 | 7/2009 | Davis | |
| 2009/0197597 A1 | 8/2009 | Kotecha | |
| 2009/0207806 A1 | 8/2009 | Makela | |
| 2009/0239531 A1 | 9/2009 | Andreasen | |
| 2009/0240789 A1 | 9/2009 | Dandabany | |
| 2009/0247170 A1 | 10/2009 | Balasubramanian | |
| 2009/0257380 A1 | 10/2009 | Meier | |
| 2009/0303883 A1 | 12/2009 | Kucharczyk | |
| 2009/0310557 A1 | 12/2009 | Shinozaki | |
| 2010/0020753 A1 | 1/2010 | Fulknier | |
| 2010/0046368 A1 | 2/2010 | Kaempfer | |
| 2010/0057930 A1 | 3/2010 | DeHaan | |
| 2010/0061234 A1 | 3/2010 | Pai | |
| 2010/0067379 A1 | 3/2010 | Zhao | |
| 2010/0112540 A1 | 5/2010 | Gross | |
| 2010/0115278 A1 | 5/2010 | Shen | |
| 2010/0115576 A1 | 5/2010 | Hale | |
| 2010/0132040 A1 | 5/2010 | Bhagwat | |
| 2010/0195585 A1 | 8/2010 | Horn | |
| 2010/0208614 A1 | 8/2010 | Harmatos | |
| 2010/0228843 A1 | 9/2010 | Ok | |
| 2010/0238871 A1 | 9/2010 | Tosic | |
| 2010/0240313 A1 | 9/2010 | Kawai | |
| 2010/0254316 A1 | 10/2010 | Sendrowicz | |
| 2010/0260091 A1 | 10/2010 | Seok | |
| 2010/0290397 A1 | 11/2010 | Narayana | |
| 2010/0304738 A1 | 12/2010 | Lim | |
| 2010/0311420 A1 | 12/2010 | Reza | |
| 2010/0322217 A1 | 12/2010 | Jin | |
| 2010/0325720 A1 | 12/2010 | Etchegoyen | |
| 2011/0004913 A1 | 1/2011 | Nagarajan | |
| 2011/0040867 A1 | 2/2011 | Kalbag | |
| 2011/0051677 A1 | 3/2011 | Jetcheva | |
| 2011/0055326 A1 | 3/2011 | Michaelis | |
| 2011/0055928 A1 | 3/2011 | Brindza | |
| 2011/0058524 A1 | 3/2011 | Hart | |
| 2011/0064065 A1 | 3/2011 | Nakajima | |
| 2011/0085464 A1 | 4/2011 | Nordmark | |
| 2011/0182225 A1 | 7/2011 | Song | |
| 2011/0185231 A1 | 7/2011 | Balestrieri | |
| 2011/0222484 A1 | 9/2011 | Pedersen | |
| 2011/0258641 A1 | 10/2011 | Armstrong | |
| 2011/0292897 A1 | 12/2011 | Wu | |
| 2012/0014386 A1 | 1/2012 | Xiong | |
| 2012/0290650 A1 | 11/2012 | Montu | |
| 2012/0322435 A1 | 12/2012 | Erceg | |
| 2013/0003729 A1 | 1/2013 | Raman | |
| 2013/0003739 A1 | 1/2013 | Raman | |
| 2013/0003747 A1 | 1/2013 | Raman | |
| 2013/0028158 A1 | 1/2013 | Lee | |
| 2013/0059570 A1 | 3/2013 | Hara | |

(56) References Cited

U.S. PATENT DOCUMENTS

| | | |
|---|---|---|
| 2013/0086403 A1 | 4/2013 | Jenne |
| 2013/0103833 A1 | 4/2013 | Ringland |
| 2013/0188539 A1 | 7/2013 | Han |
| 2013/0227306 A1 | 8/2013 | Santos |
| 2013/0227645 A1 | 8/2013 | Lim |
| 2013/0230020 A1 | 9/2013 | Backes |
| 2013/0250811 A1 | 9/2013 | Vasseur |
| 2014/0269327 A1 | 9/2014 | Fulknier |
| 2014/0298467 A1 | 10/2014 | Bhagwat |
| 2015/0120864 A1 | 4/2015 | Unnimadhavan |

FOREIGN PATENT DOCUMENTS

| | | |
|---|---|---|
| EP | 1732276 | 12/2006 |
| EP | 1771026 | 4/2007 |
| EP | 1490773 | 1/2013 |
| WO | 0059251 | 10/2000 |
| WO | 0179992 | 10/2001 |
| WO | 2004042971 | 5/2004 |
| WO | 2006129287 | 12/2006 |
| WO | 2009141016 | 11/2009 |

OTHER PUBLICATIONS

Clausen, T., et al., "Optimized Link State Routing Protocol (OLSR)," Network Working Group, pp. 1-71, Oct. 2003.

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

He, Changhua et al., "Analysis of the 802.11i 4-Way Handshake," Proceedings of the 3rd ACM Workshop on Wireless Security, pp. 43-50, Oct. 2004.

IEEE Computer Society, "IEEE Std 802.11i—Part 11: Wireless LAN Medium Access Control (MAC) and Physical Layer (PHY) Specifications—Amendment 6: Medium Access Control (MAC) Security Enhancements," Section H.4.1, pp. 165-166, Jul. 23, 2014.

Lee, Jae Woo et al, "z2z: Discovering Zeroconf Services Beyond Local Link," 2007 IEEE Globecom Workshops, pp. 1-7, Nov. 26, 2007.

Perkins, C., et al., "Ad hoc On-Demand Distance Vector (AODV) Routing," Network Working Group, pp. 1-35, Oct. 2003.

Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.

European Patent Application No. 11823931.8, Search Report dated Aug. 29, 2016.

European Patent Application No. 12879114.2, Search Report dated Jan. 21, 2016.

International Application No. PCT/US2008/061674, International Search Report and Written Opinion dated Oct. 14, 2008.

International Application No. PCT/US2011/047591, International Search Report and Written Opinion dated Dec. 19, 2011.

International Application No. PCT/US2012/059093, International Search Report and Written Opinion dated Jan. 4, 2013.

Cisco Systems, Inc., "Wi-Fi Protected Access 2 (WPA 2) Configuration Example," Document ID 67134, Jan. 21, 2008 [retrieved online at https://www.cisco.com/c/en/us/support/docs/wireless-mobility/wireless-lan-wlan/67134-wpa2-config.html on Dec. 4, 2018].

* cited by examiner

PREDICTIVE ROAMING BETWEEN SUBNETS

CROSS-REFERENCE TO RELATED APPLICATIONS

The present application is a continuation application of U.S. patent application Ser. No. 15/412,949, filed Jan. 23, 2017, which is a continuation application of U.S. patent application Ser. No. 14/686,665, filed Apr. 14, 2015, now U.S. Pat. No. 9,590,822, which is a continuation application of U.S. patent application Ser. No. 14/139,819, filed Dec. 23, 2013, now U.S. Pat. No. 9,025,566, which is a continuation application of U.S. patent application Ser. No. 13/452,437, filed Apr. 20, 2012, now U.S. Pat. No. 8,614,989, which is a continuation application of U.S. patent application Ser. No. 12/120,338, filed May 14, 2008, now U.S. Pat. No. 8,218,502, all of which are incorporated herein by reference.

BACKGROUND

Wireless data networks allow computers or other electronic devices to exchange data without wires, typically using radio waves. Wireless networks are popular with users due to the ability to send and receive data almost anywhere within the physical coverage area of the network. This allows users to access communication networks, including local area networks, organization or company intranets, virtual private networks, and wide area networks, such as the Internet, anywhere within the physical coverage area of the wireless networks.

Wireless networks with large physical coverage areas, such as networks covering university campuses or entire cities, offer users ubiquitous access to their data and the Internet. However, typical wireless access points have ranges of around 100 feet. As a result, large wireless networks require tens, hundreds, or thousands of wireless access points to provide network coverage over a large physical area.

Configuring, managing, and operating a large number of wireless access points requires complicated network configurations. Typically, a large wireless network is divided into a number of different network subnets. Each network subnet includes one or more wireless access points. Each network subnet is assigned a specific range of IP addresses. All of the wireless access points within a subnet as well as the wireless client devices connected with these wireless access points are assigned IP addresses within the range of IP addresses associated with a subnet.

The use of multiple subnets within a wireless network introduces the problem of roaming. A wireless client, especially mobile devices, may move to different physical locations while connected with the wireless network. If a wireless client moves from the physical area associated with one wireless access point to a physical area associated with a second wireless access point, it is desirable for the wireless client to automatically connect with the second wireless access point to maintain its network connection. If both wireless access points are within the same subnet, the wireless client can keep the same IP address, allowing roaming to occur seamlessly without any noticeable disruption in the network connection or data traffic.

However, if a wireless client moves between wireless access points in different subnets, the wireless client cannot keep the same IP address. This is because each subnet has its own exclusive range of IP addresses. When the wireless client is connected with a wireless access point in a first subnet, the wireless client will have an IP address in the first subnet's IP address range. When the wireless client tries to connect with a wireless access point in a second subnet, its IP address is outside the second subnet's IP address range. As a result, the wireless client must be reauthenticated and assigned a new IP address that is valid for the second subnet. This process can cause noticeable disruption in the network connection and data traffic for the wireless client. This disruption is unacceptable for some applications, such as VoIP telephone applications.

The Mobile IP protocol is one approach for maintaining network connections of wireless devices. In the Mobile IP protocol, a wireless client is identified by its home address disregarding its current location in the Internet. The wireless client also carries the address of a home agent, which is a device located within the same subnet as its home address. When a wireless client moves from its home address to a new subnet, the wireless client locates a designated forwarding agent within the new subnet. The wireless client provides the forwarding agent with the address of its home agent. The forwarding agent then sets up a network tunnel with the home agent. Network traffic directed to the wireless client's home address is intercepted by the home agent and sent via the tunnel to the forwarding agent, which in turn forwards it to the wireless client. Similarly, network traffic from the wireless client is intercepted by the forwarding agent and sent via the tunnel to the home agent, which in turn forwards it to its intended destination.

One problem with the Mobile IP protocol is that it relies on the wireless client to maintain the network connection when roaming. The wireless client is responsible for carrying the address of the home agent and for contacting a forwarding agent as needed. To meet these responsibilities, the wireless client must either include a modified network driver stack or applications that support Mobile IP. The wireless client must keep track of two different IP addresses: the initial IP address in the client's "home" subnet and the IP address in the client's current subnet. Even if wireless clients include these capabilities, it is difficult and time-consuming to correctly configure large numbers of wireless clients to support Mobile IP roaming within a wireless network. Furthermore, wireless clients may need to be reconfigured whenever there are changes in network topology.

Therefore, there is an unmet need to enable wireless clients to roam without modifying the wireless client or its applications to support roaming protocols. There is also an unmet need for wireless clients to roam without requiring special configuration or knowledge of the network topology. There is also an unmet need to support wireless client roaming in an efficient and reliable manner.

SUMMARY

In a specific implementation, wireless access points select at least one home agent in a subnet to support network traffic from roaming wireless clients. Wireless access points can also, for example, detect neighboring wireless access points in different subnets. One or more of the wireless access points can provide the address of their home agents to neighboring wireless access points, which in turn forward these addresses to their own home agents. Thus, each home agent can be provided the addresses of home agents in other network subnets.

In a specific implementation, upon connecting with a wireless client, a wireless access point or other device determines predictive roaming information for the wireless client. Predictive roaming information may include, for example, information identifying the wireless client; its home network subnet (i.e. the network subnet associated with the wireless client's current IP address); and connection information used to communicate with the wireless client, such as session keys and virtual LAN information. In a specific implementation, the wireless access point forwards the predictive roaming information associated with a wireless client to at least a portion of its neighboring wireless access points while the wireless client is still connected with the wireless access point.

In a specific implementation, neighboring wireless access points cache or store received predictive roaming information. Upon connecting with a wireless client, a neighboring wireless access point compares identifying information of the newly connected wireless client with the cached predictive roaming information. If the newly connected wireless client matches at least a portion of the predictive roaming information, the neighboring wireless access point uses the predictive roaming information to quickly connect with the wireless client and to establish a tunnel to redirect network traffic associated with the wireless client through to its home subnet.

In a specific implementation, a neighboring wireless access point contacts its home agent to determine the address of a home agent in the home subnet of a wireless client. The neighboring wireless access point then establishes a tunnel between itself or another device in its own subnet to the home agent or other device in the home subnet of the wireless client. The home agent in the home subnet of the wireless client may or may not be selected using a load balancing technique. The home agent in the home subnet of the wireless client may or may not be configured to intercept network traffic associated with the wireless client. In a specific implementation, the neighboring wireless access point uses layer 2 routing to communicate with the wireless client, allowing the wireless client to continue using its IP address in a different subnet.

In a specific implementation, if the newly connected wireless client does not match at least a portion of the predictive roaming information of a neighboring wireless access point, the neighboring wireless access point sends a query message to its home agent to identify the home subnet of the wireless client. The home agent forwards the query message to home agents in other subnets, which in turn may or may not forward the query message to wireless access points and other devices to identify the home subnet of the wireless client. The neighboring wireless access point can eventually receive a response to the query message that identifies the home subnet of the wireless client. The wireless access point can then use this home subnet information to establish a tunnel to redirect network traffic for the wireless client through its home subnet, as described above. Later, for example, if the wireless client's network connection becomes idle, a new IP address can be assigned within the current subnet to the wireless client and potentially remove the tunnel to conserve network resources.

BRIEF DESCRIPTION OF THE DRAWINGS

Techniques related to the invention are described with reference to the drawings.

In the drawings, the use of identical reference numbers indicates identical elements.

DETAILED DESCRIPTION

Figure 1:
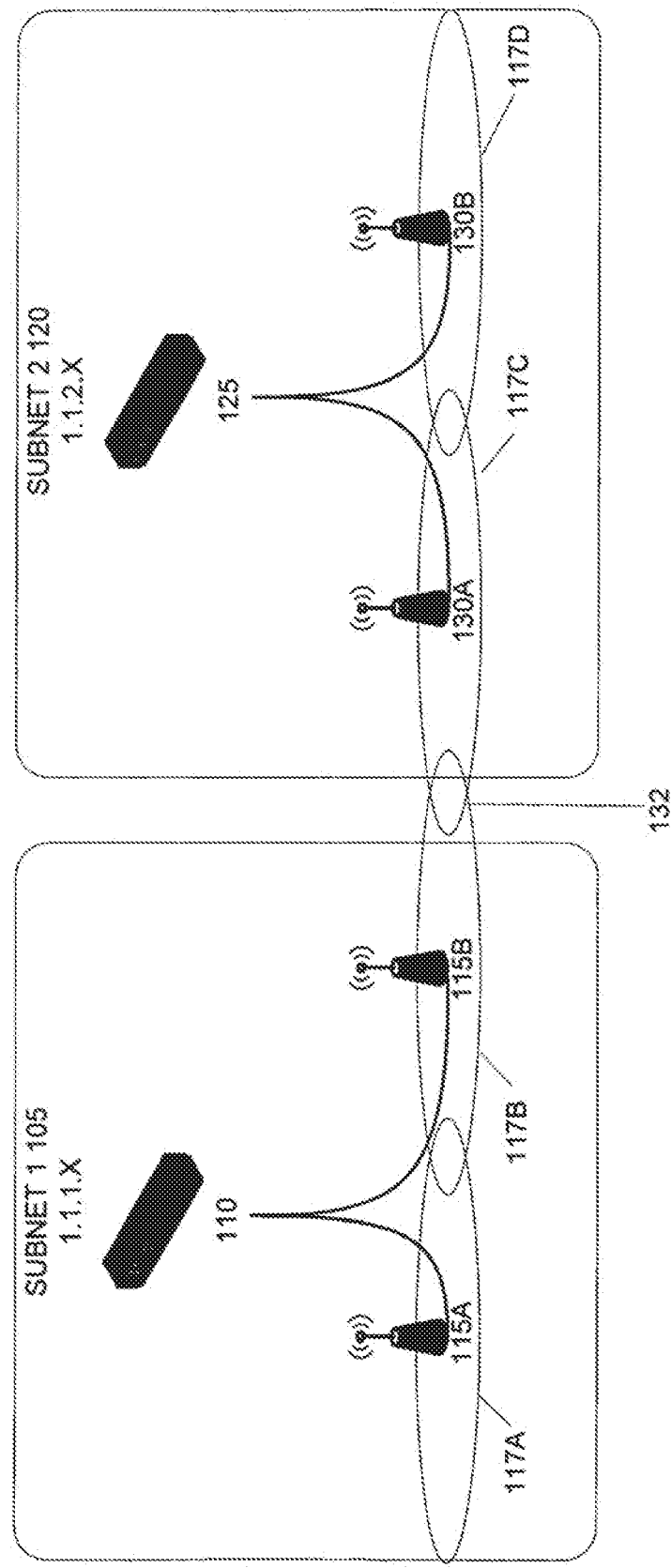
FIG. 1 illustrates an example wireless network.

FIG. 1 illustrates an example wireless network 100. Wireless network 100 includes subnet 1 105, which is associated with the range of IP addresses 1.1.1.X, and subnet 2 120, which is associated with the range of IP addresses 1.1.2.X. In an embodiment, devices in subnets 1 105 and 2 120 are connected with each other and other networks, such as the Internet, via wired or wireless network connections, which are omitted from the figures for clarity.

Subnet 1 105 includes a switch 110 responsible for connecting network segments. In an embodiment, switch 110 is a layer 2 network switch, such as a network bridge, adapted to direct network traffic at the data link layer of a networking protocol, for example using media access control (MAC) addresses, rather than IP address. In another embodiment, switch 1 110 may be a layer 3 network switch, such as a router, or include higher-level network traffic control, such as layer 4 firewalls and network address translation.

Subnet 1 105 includes wireless access points 115, including wireless access points 115a and 115b. Wireless access points 115 may implement any type of standard or proprietary wireless data communication protocols, including the 802.11 family of protocols, such as 802.11a, 802.11b, 802.11g, and 802.11n. Wireless access points 115 are connected with the switch 110 via wired or wireless network connections. Each of the wireless access points 115 may provide wireless data communications with one or more wireless network clients. Similar to subnet 1 105, subnet 2 120 includes switch 125, similar to switch 110, and wireless access points 130, similar to wireless access points 115.

Each of the wireless access points 115 and 130 has a physical coverage area 117, which is the physical area in which a wireless client device may be able to connect with a wireless access point. To ensure continuous network coverage, the physical coverage areas 117 of the wireless access points 115 and 130 may overlap. For example, the physical coverage area 117a of wireless access point 115a overlaps the physical coverage area 117b of wireless access point 115b. Additionally, physical coverage areas of wireless access points in different subnets may overlap if the wireless access points are physically close together. For example, physical coverage area 117b, associated with subnet 1 105, overlaps physical coverage area 117c, associated with subnet 2 120, in area 132.

Figure 2:
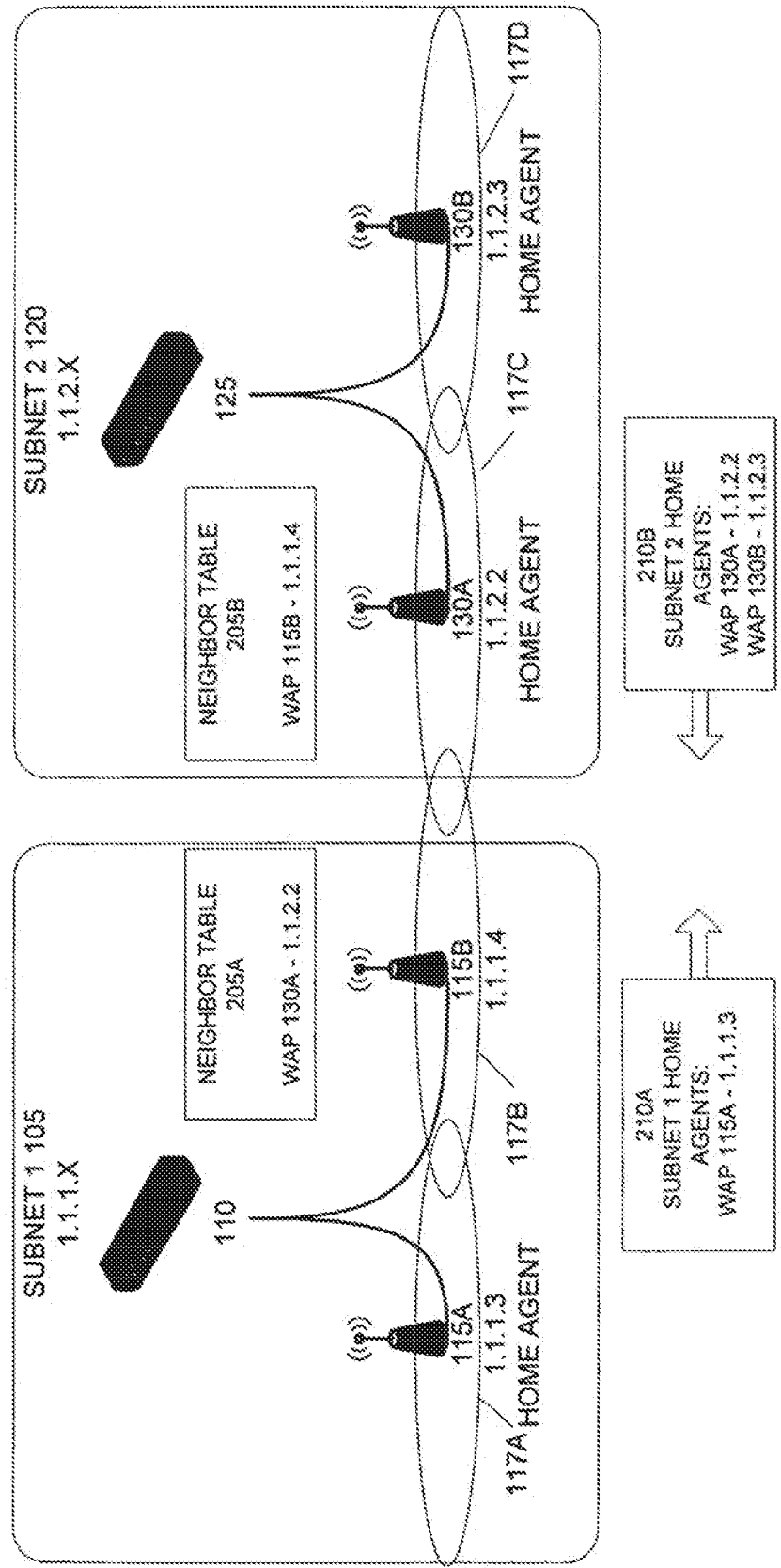
FIG. 2 illustrates an example network initialization for roaming.

FIG. 2 illustrates an example network initialization 200 for roaming. In an embodiment, a wireless network, such as wireless network 100, is initialized for roaming wireless clients by 1) discovering neighboring wireless access points; 2) selecting home agents; and 3) exchanging home agent addresses.

In a specific implementation, to discover neighboring wireless access points, wireless access points can be adapted to scan available wireless data radio channels for wireless access points in different subnets. In an embodiment, wireless access points periodically broadcast a beacon signal identifying themselves to any nearby wireless access points. The beacon signal may include a wireless access point's IP address or other information identifying the wireless access point's network subnet.

Upon receiving a beacon signal from another wireless access point, an embodiment of a wireless access point compares the subnet specified by the beacon signal with its own subnet. If the wireless access point determines that the beacon signal is associated with a wireless access point in a different subnet, the wireless access point adds this wireless access point to its neighbor table with a designation indicating that it is in a different subnet. This indication may include the address, such as an IP address, of the wireless access point in the other subnet.

For example, because wireless access points 115b and 130a have overlapping physical coverage areas 117, they will detect each other's beacon signals. As a result, wireless access point 115b will add wireless access point 130a to its neighbor table 205a. In this example, neighbor table 205a will include the IP address, 1.1.2.2, of wireless access point 130a. Similarly, wireless access point 130a will add wireless access point's 115b IP address of 1.1.1.4 to its neighbor table 205b.

In a further embodiment, neighboring wireless access points may discover each other using probe request and probe response message. In this embodiment, a wireless access point periodically scans all communication channels and sends out probe request frames. Any neighboring wireless access points using one of these communication channels and receiving a probe request frame will respond with a probe response frame that includes identifying information, such as the neighboring wireless access points IP address or network subnet.

Additionally, the network initialization 200 selects one or more home agents within its network subnet for each wireless access point. A home agent may be a wireless access point, a network switch, a dedicated device, a computer system, or any other device in a subnet that is capable of performing home agent tasks, which are described in detail below. In a further embodiment, a wireless access point may act as its own home agent and optionally the home agent of one or more additional wireless access points.

In an embodiment, network initialization 200 also established a tunnel or other network connection between neighboring wireless access points in different subnets. This tunnel or network connection may be used for exchanging predictive roaming information, as described below; home agent information to be used for nomadic roaming; and/or any other data shared between subnets.

In an embodiment, a subnet may include one or more home agents for load balancing and reliability purposes. In an embodiment, each device in a subnet capable of acting as a home agent sends out a broadcast message to other devices in the subnet. Upon receiving broadcast messages from potential home agent devices, a wireless access point selects one or more of the potential home agent devices, possibly including itself, as its home agent.

A home agent is the contact point within a subnet for network traffic from roaming wireless clients in other subnets. As described in detail below, a home agent may be used to receive and retransmit network traffic associated with a roaming wireless client. In some circumstances, a home agent may also contact home agents in other subnets to locate the home subnet of a wireless client device.

For example, wireless access points 115a, 130a, and 130b are configured to act as home agents. Thus, wireless access point 115a will be selected as the home agent for subnet 1 105 and wireless access points 130a and 130b will be selected as the home agents for subnet 2 120. Neighbor wireless access points 115b and 130a, as well as the other wireless access points, will have the IP addresses of their respective home agents in their subnets.

To facilitate roaming, each home agent maintains a list of the addresses, such as the IP addresses, of home agents in other subnets. In an embodiment, this information is obtained by exchanging home agent addresses via the neighbor wireless access points. For example, wireless access point 115b is aware that wireless access point 130a is in a different subnet. Thus, wireless access point 115b sends home agent information 210a to the neighboring wireless access point 130a. Similarly, wireless access point 130a sends home agent information 210b to wireless access point 115b. Following the exchange of home agent information 210, wireless access points 115b and 130a have the addresses of home agents in both subnet 1 105 and subnet 2 120. Wireless access points 115b and 130a may then share this information with their respective home agents, so that home agents 115a, 130a, and 130b each have the addresses of home agents in both subnet 1 105 and subnet 2 120. In an embodiment, home agent information 210 may travel directly between neighboring wireless access points via their wireless data connection or indirectly through wired and/or wireless network connections and numerous network devices to reach neighboring wireless access points in different subnets.

Once the wireless network has been initialized by discovering neighboring wireless access points, selecting home agents, and exchanging home agent addresses, the wireless network is ready to support roaming wireless clients. One type of roaming enabled by techniques described in this paper is predictive roaming. Predictive roaming allows wireless clients to connect with one or more subnets outside of their initial or home subnet while maintaining their IP addresses in the home subnet and without any disruption to their network connections or data traffic.

Figure 3:
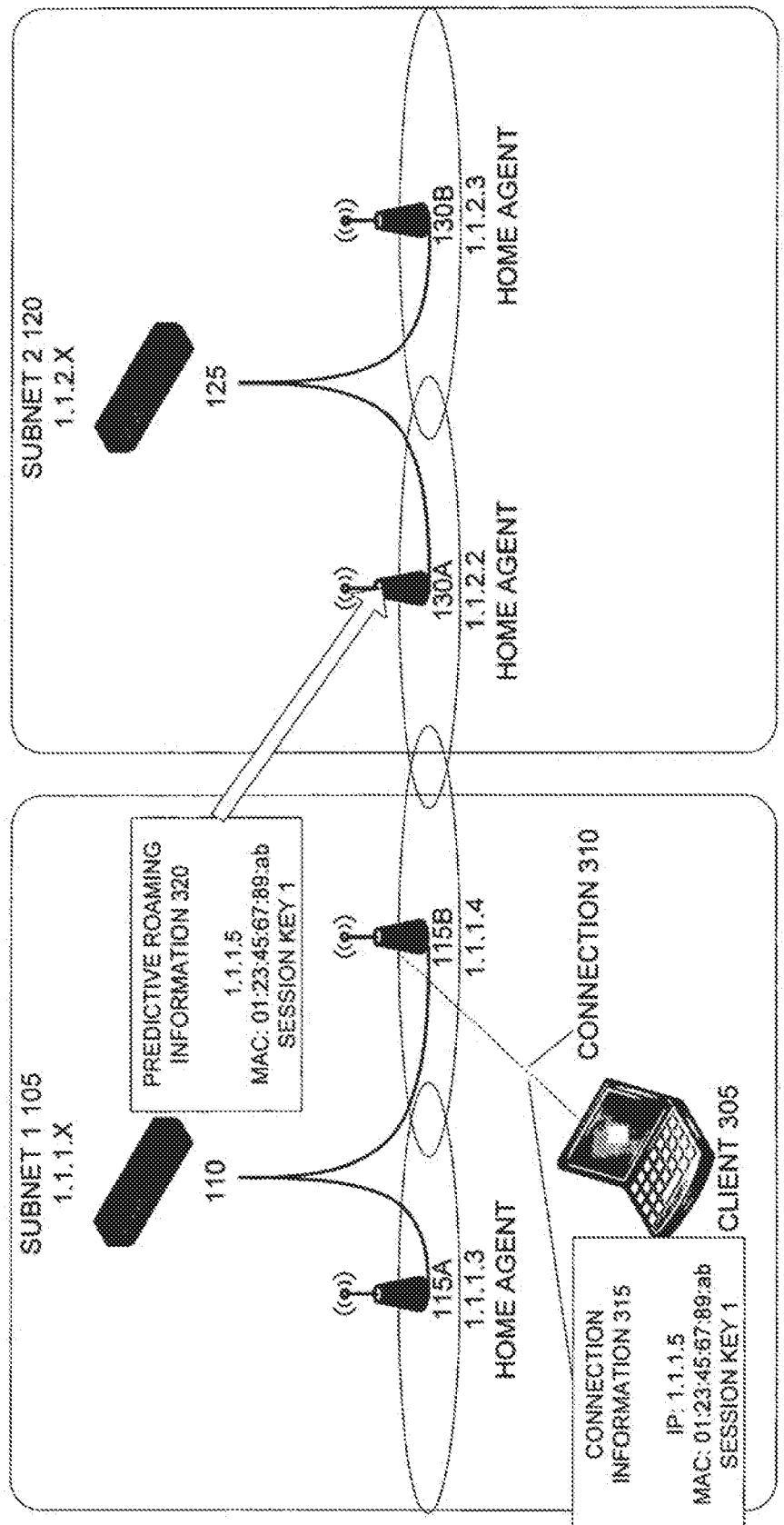
FIG. 3 illustrates a first part of an example of predictive roaming.

FIG. 3 illustrates a first part 300 of an example of predictive roaming. In this example, a wireless network, such as wireless network 100, is connected with a wireless client 305. Wireless clients can include mobile devices, such as laptop computers, personal digital assistants, mobile Internet devices, media player devices with wireless network interfaces, voice over IP (VoIP) telephone devices, and navigation systems with wireless network interfaces; fixed devices, such as desktop computers with wireless network interfaces; and any other electronic device including a wireless network interface.

In this part 300 of the example of predictive roaming, the wireless client 305 is connected with wireless access point 115b. Wireless access point 115b provides wireless client 305 with a network connection 310 to the wireless network 100 as well as any other connected networks, such as the Internet. Upon the wireless client connecting with a wireless access point that is a neighbor to any wireless access point in a different subnet, an embodiment of the wireless access point provides connection information for the wireless client to one or more neighboring wireless access points in different subnets. This connection information is referred to as predictive roaming information and is used to maintain the wireless client's network connection if it roams to the physical coverage area of a different subnet.

In an embodiment, the predictive roaming information includes the IP address and MAC address associated with a wireless client; session keys used for security and/or encryption of the wireless client's network connection; and optionally other information used to establish and maintain the wireless client's network connection, such as virtual LAN (VLAN) information, including, for example, a virtual LAN identifier.

For example, wireless client 305 is connected via network connection 310 with wireless access point 115b. Network connection 310 includes connection information 315, including for example the IP address, MAC address, and session keys, used by wireless client 305 to communicate with wireless access point 115b. In an embodiment, when wireless client 305 establishes a connection with wireless access point 115b, wireless access point 115b forwards predictive roaming information 320, for example including the IP address, MAC address, and session keys used by the wireless client 305, to its neighbor wireless access point 130a in subnet 2 120. In an embodiment, predictive roaming information 320 may travel directly between neighboring wireless access points via their wireless data connection or indirectly through wired and/or wireless network connections and numerous network devices to reach neighboring wireless access points in different subnets. Wireless access point 130a stores the predictive roaming information 320 associated with wireless client 305 for later use.

Figure 4:
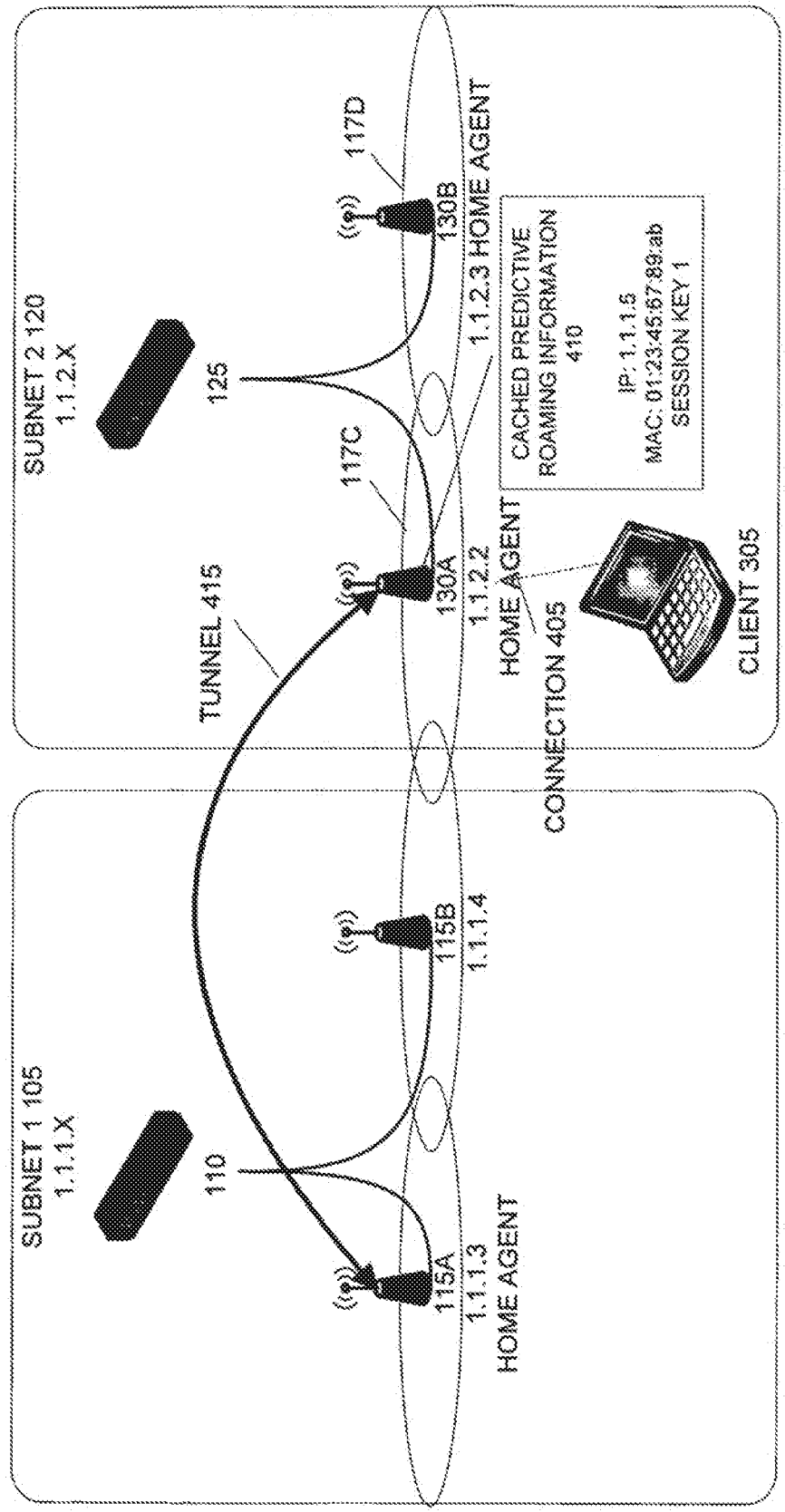
FIG. 4 illustrates a second part of an example of predictive roaming.

FIG. 4 illustrates a second part 400 of an example of predictive roaming. If wireless client 305 roams to the physical coverage area 117c of wireless access point 130a, wireless client 305 will attempt to establish a network connection 405 with wireless access point 130a in subnet 2 120. Upon connecting with the wireless client 305, wireless access point 130a will obtain identifying information, such as the MAC address of the wireless client 305. Wireless access point 130a will compare this identifying information with its stored predictive roaming information 410.

In this example 400, the MAC address of the wireless client 305 matches the predictive roaming information 410 previously received from wireless access point 115b. As a result, wireless access point 130a knows the home IP address of the wireless client 305. Using this home IP address of wireless client 305, wireless access point 130a determines the home subnet of the wireless client 305, in this case subnet 1 105. Wireless access point 130a contacts one of its home agent devices (i.e. itself or wireless access point 130b) to determine the IP address of a home agent in the home subnet (i.e. subnet 1 105) of the wireless client 305, such as wireless access point 115a.

Wireless access point 130a then establishes a tunnel 415, such as a GRE tunnel, between itself and the home agent 115a in subnet 1 105 for carrying network traffic associated with wireless client 305. Additionally, wireless access point 130a uses the session keys and other information included in the stored predictive roaming information 410 to communicate with the wireless client 305 via network connection 405. In a further embodiment, if other wireless clients with home IP addresses in subnet 1 105 roam to wireless access point 130a in subnet 2 120, tunnel 415 may be used to carry these wireless clients' network traffic as well.

The process of predictive roaming shown in FIGS. 3 and 4 may be repeated as the wireless client moves to the physical coverage areas of other wireless access points within subnet 2 120 or other subnets. For example, upon the wireless client 305 connecting with wireless access point 130a, as shown in FIG. 4, wireless access point 130a will provide a copy of the predictive roaming information 410 for wireless client 305 to any neighboring wireless access points in the same or a different subnet, such as wireless access point 130b. If the wireless client 305 later moves into the physical coverage area 117d of wireless access point 130b, wireless access point 130b will use its copy of the predictive roaming information 410 to establish a tunnel between itself and the home agent 115a to handle the data traffic of wireless client 305.

Figure 5:
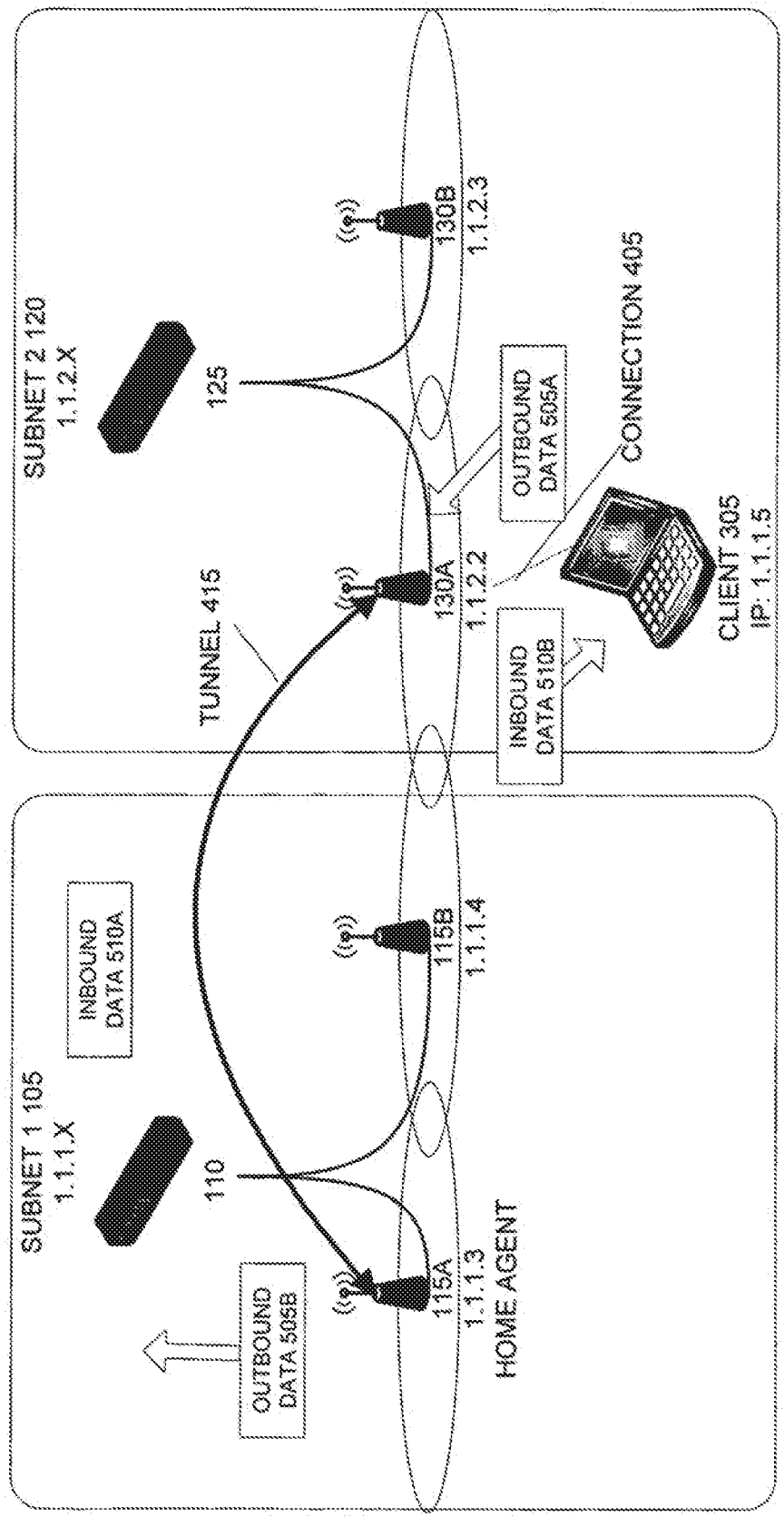
FIG. 5 illustrates example data traffic during predictive roaming.

FIG. 5 illustrates an example 500 of data traffic during predictive roaming. In the example 500 of FIG. 5, data 505a from wireless client 305 is communicated via network connection 405 to wireless access point 130a. Wireless access point 130a directs data 505a through tunnel 415 to wireless access point 115a, which acts a home agent for subnet 1 105, the home subnet of wireless client 305. Wireless client 115a then rebroadcasts data 505b to its intended destination.

In an embodiment, when the tunnel 415 is established or when a new wireless client uses the tunnel 415, the home agent wireless access point 115a, switch 110, and any other devices in subnet 1 105 modify their routing tables to redirect network traffic addressed to the wireless client to the home agent wireless access point 115a. This may be done, for example, by associating the home agent 115a with the MAC address of the wireless client 305 and using layer 2 routing to direct data traffic within the subnet. In this example, when a wireless client is newly associated with a tunnel to a home agent in its home subnet, the home agent broadcasts a routing update message to other devices within the subnet to associate the wireless client's MAC address or other identifying information with the home agent.

The updated routing information is used to intercept and redirect network traffic addressed to roaming wireless clients. During predictive roaming, the wireless client 305 believes it still has its original IP address in its home subnet 1 105. Thus, example data 510a directed to the wireless client 305 will be addressed to the IP address of wireless client 305. In an embodiment, switch 110 in subnet 1 105 receives data 510a addressed to the home IP address of wireless client 305 and uses layer 2 routing to redirect this data 510b to the home agent wireless access point 115a, in accordance with its updated routing tables. In this example, redirected data 510b is addressed to the MAC address of the wireless client 305.

Upon receiving redirected data 510b, home agent wireless access point 115a forwards this data 510b through tunnel 415 to wireless access point 130a. Wireless access point 130a uses layer 2 routing, such as MAC addresses, to direct data 510b to wireless client 305.

Similarly, in a further embodiment, any broadcast data traffic within subnet 1 105 is also received by home agent wireless access point 115a and forwarded via tunnel 415 to the wireless client 305.

In the above examples of predictive roaming, neighboring wireless access points receive roaming information about nearby wireless clients before potentially connecting with the wireless clients. However, in some cases, a wireless access point may receive a connection request from a wireless client without previously receiving any associated roaming information. For example, a wireless device may originally connect with a wireless network in a first subnet, and then enter a low-power, inactive, or suspended operation mode. A user may then move the wireless device in its inactive state to the physical coverage area of a different, non-adjacent wireless access point in a different subnet.

Figure 6:
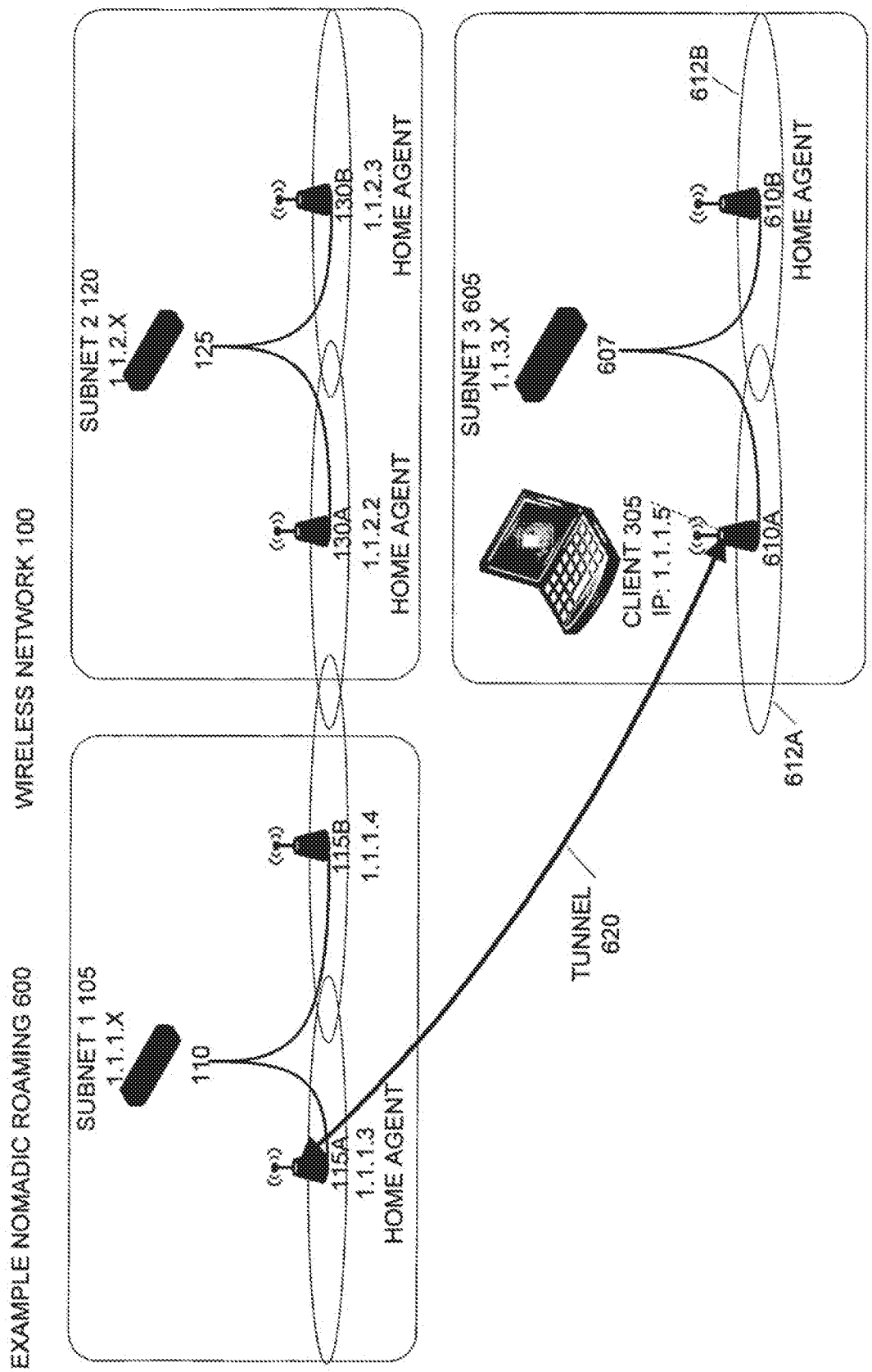
FIG. 6 illustrates an example of nomadic roaming.

In a specific implementation, a nomadic roaming mode allowing wireless clients to keep their IP address when moving to a different subnet, even if wireless access points do not have predictive roaming information for these wireless clients. FIG. 6 illustrates an example 600 of nomadic roaming. In example 600, the wireless network 100 described above has been expanded to include subnet 3 605. Subnet 3 605 includes a switch 607 and wireless access points 610a and 610b. In this example 600, the physical coverage areas 612 of wireless access points 610a and 610b do not overlap with the physical coverage areas of any of the wireless access points in subnets 1 105 or 2 120. In subnet 3 605, wireless access point 610b acts as a home agent.

For example 600, it is assumed that wireless client 305 was previously connected with wireless access point 115b, as shown in FIG. 3. For example 600, wireless client 305 is moved to the physical coverage area 612a associated with wireless access point 610a. Wireless client 305 forms a network connection with wireless access point 610a. However, wireless access point 610a does not include any predictive roaming information associated with wireless client 305, for example because wireless client 305 was in an inactive state during its movement to subnet 3 605 or because of a gap in the physical coverage of the wireless network 100 between subnets 1 105 and 3 605.

In an embodiment, wireless access point 610a compares the MAC address or other identifying information of wireless client 305 with its stored predictive roaming information, if any. If the wireless access point 610a does not have any predictive roaming information for the wireless client 305, wireless access point 610a attempts to locate the home subnet of the wireless client 305. In an embodiment, wireless access point 610a provides its home agent, in this example wireless access point 610b with the MAC address of the wireless client 305.

As described above, home agents know the address of home agents in other subnets. Home agent 610b sends a broadcast query message including wireless client's 305 MAC address to at least one of the home agents in each of the subnets 1 105 and 2 120. Each home agent receiving this broadcast query message will determine if this MAC address was last associated with itself, either directly or through another wireless access point in the same subnet. If a home agent does not have a cache of associated wireless clients, it will rebroadcast this query message to any other wireless access points in the subnet, asking these wireless access points if they were previously connected with a wireless client having this MAC address.

In response to this query message, at least one wireless access point will respond indicating that it was previously connected with the wireless client 305. In example 600, wireless access point 115b responds to this query message. This response is forwarded back to wireless access point's 115b home agent, wireless access point 115a, which in turn forwards the response to home agent 610b and back to wireless access point 610a. Wireless access point 610a will use this information to establish a tunnel 620 between itself and a home agent in subnet 1 105, the wireless client's 305 home subnet. The establishment and operation of the tunnel 620 is similar to that of tunnel 415 used for predictive roaming discussed above. However, because wireless access point 610a does not have session keys or other security information associated with wireless client 305, wireless access point 610a will have to establish a new session and exchange new security information with wireless client 305. Despite this, wireless client 305 can continue to operate as if it had its original IP address in subnet 1 105.

For both predictive and nomadic roaming, a tunnel is used to carry network traffic addressed to the wireless client's original IP address in a home subnet to the wireless client when it is in a different subnet. This allows the wireless client to roam to different network subnets without disrupting network data traffic. However, maintaining tunnels for large numbers of wireless clients may be inefficient. In a further embodiment, if a network connection of a wireless client is idle or inactive for a sufficiently long period of time, the wireless client is sent a message breaking down its old network connection and assigning the wireless client a new IP address in its current network subnet. Because the wireless client's network connection is inactive, this operation does not cause any noticeable disruption in network service. At this point, the tunnel may be discarded if not needed by other wireless clients.

Figure 7:
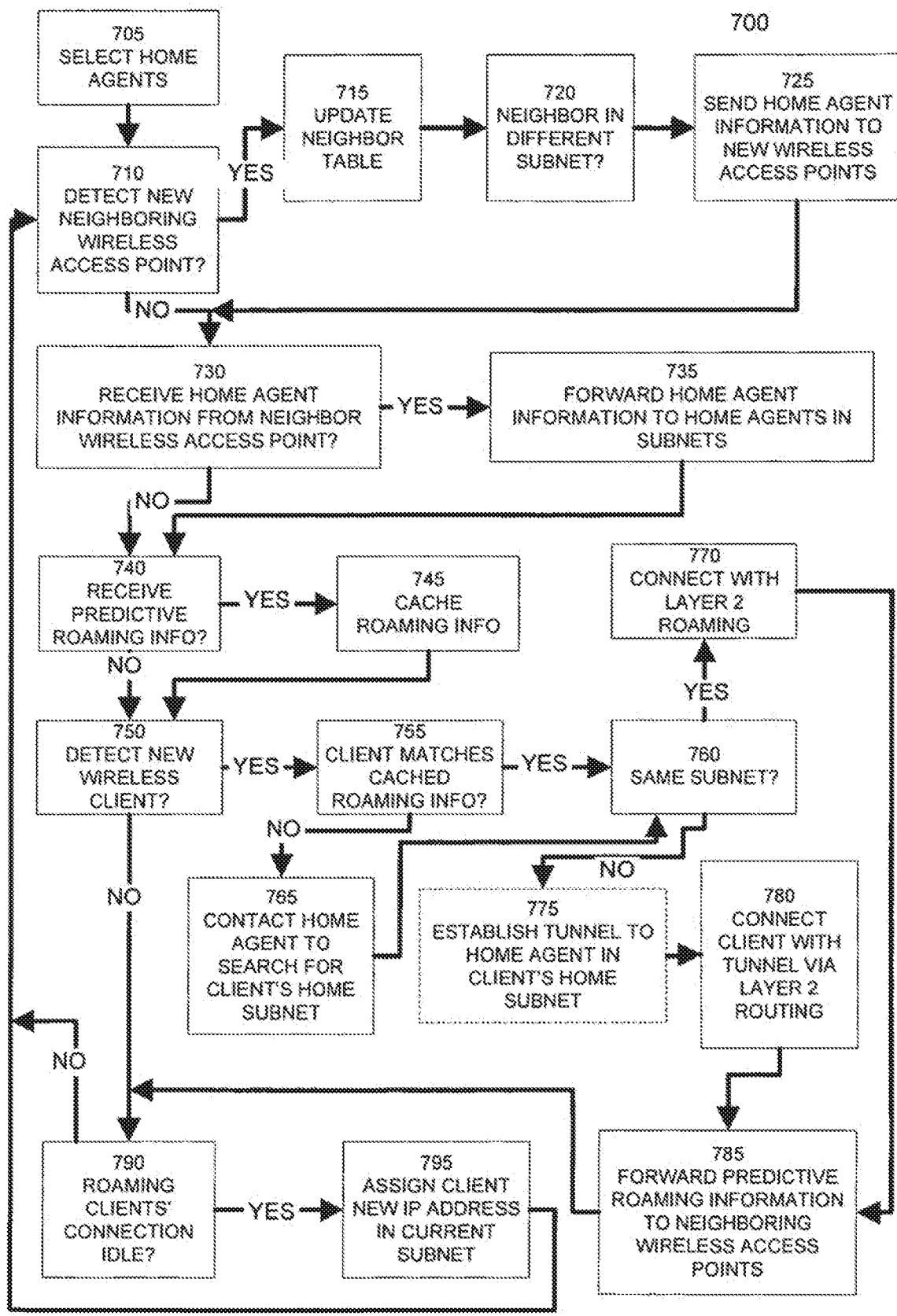
FIG. 7 illustrates an example method implementing predictive and nomadic roaming in a wireless access point or other network device.

FIG. 7 illustrates an example method 700 implementing predictive and nomadic roaming in a wireless access point or other network device. Step 705 selects one or more home agents within the same subnet as the wireless access point. As discussed above, a wireless access point may act as its own home agent. Multiple home agents may be used in a subnet for load balancing and reliability purposes.

Step 710 determines if any new neighboring wireless access points are detected by the wireless access point. As discussed above, in a specific implementation, wireless access points detect neighboring wireless access points using their beacon radio signals. If any new neighbor wireless access points are detected, step 715 updates the neighbor table of the wireless access point to include the new neighboring wireless access point or points. Otherwise, method 700 proceeds to step 730. Following step 715, step 720 determines if the neighboring wireless access point is in a different subnet than the wireless access point. If so, step 725 sends its home agent information to the new neighboring wireless access points. Following either steps 720 or 725, method 700 proceeds to step 730.

Step 730 determines if the wireless access point has received home agent information from any neighboring wireless access points in different network subnets. If so, step 735 forwards this home agent information to its home agent or agents, so that the home agents in the wireless access point's subnet are aware of all of the home agents in other subnets. Following either step 730 or 735, method 700 proceeds to step 740.

Step 740 determines if the wireless access point has received any predictive roaming information from other wireless access points. In an embodiment, the wireless access point may receive predictive roaming information from other wireless access points in the same subnet or a different subnet. Step 745 caches any received predictive roaming information. Following either step 740 or 745, method 700 proceeds to step 750.

Step 750 determines if a new wireless client is connecting with the wireless access point. If so, step 755 determines if the wireless client matches any of the cached predictive roaming information previously received and cached by the wireless access point. If so, step 760 determines if the wireless client has been assigned an IP address in the same network subnet as the wireless access point. If so, step 770 connects with the wireless client using standard layer 2 intra-subnet roaming techniques.

Returning to step 760, if the wireless client matches the wireless access point's cached predictive roaming information and the wireless client has an assigned IP address in a different subnet than the wireless access point, then predictive roaming as described is used to maintain the network connection with the wireless client. Step 775 establishes a tunnel, such as a GRE tunnel, between the wireless access point and a home agent in the wireless client's home subnet, if a tunnel does not already exist. If a tunnel between the wireless access point and a home agent in the wireless client's subnet already exists, an embodiment of method 700 skips step 775 and the wireless access point uses the previously created tunnel.

In an embodiment, the wireless access point in step 775 contacts its home agent to determine an IP address for one or more home agents in the home subnet of the new wireless client. In a further embodiment, the wireless access point or home agent selects one or more home agents in the wireless client's home subnet using load balancing selection techniques, such as a simple round-robin selection technique. More complicated load balancing techniques may select the home agent for tunneling using load information such as network traffic; the number of tunnels associated with a home agent; CPU, memory, network bandwidth, or other computing resource usage; and network quality of service metrics.

Following step 775, step 780 connects the wireless client with the tunnel using layer 2 routing techniques, as described above with reference to FIG. 5, so that outbound data traffic from the wireless client is directed from the wireless access point via the tunnel to the wireless client's home subnet and then to its intended destination. Similarly, inbound data traffic to the wireless client is intercepted by the home agent associated with the tunnel in the wireless client's home subnet and transferred via the tunnel to the wireless access point. The wireless access point then directs the data traffic to the wireless client using layer 2 routing.

Returning to step 755, if the wireless client connecting with the wireless access point does not match the wireless access point's cached predictive roaming information, then an embodiment of method 700 uses the nomadic roaming techniques described above to connect with the wireless client. Accordingly, the wireless access point in step 765 contacts its home agent and requests that it locates the home subnet of the wireless client. The home agent sends a query message including the MAC address and/or other identifying information of the wireless to home agents in other subnets to locate the home subnet of the wireless client, as described above.

Upon receiving a reply message identifying the home subnet of the wireless client, an embodiment of the wireless access point proceeds from step 765 to step 760. Method 700 then proceeds as described above.

Following either step 770 or 780, an embodiment of method 700 proceeds to step 785 and forwards predictive roaming information about the wireless client to neighboring wireless access points on its neighbor list. This information may be used by neighboring wireless access points if the wireless client later roams to any of the neighboring wireless access points in the same subnet or a different subnet.

Following step 785, method 700 proceeds to step 790. Step 790 determines if any of the roaming wireless clients currently connected with the wireless access point have idle network connections. If so, step 795 assigns a new IP address within the current subnet to the wireless client. If there are no more roaming wireless clients using a tunnel associated with the wireless access point, then an embodiment of step 795 may remove the tunnel to conserve network resources.

Following either step 790 or 795, method 700 may return to step 710 to repeat a portion of method 700 for additional iterations.

Figure 8:
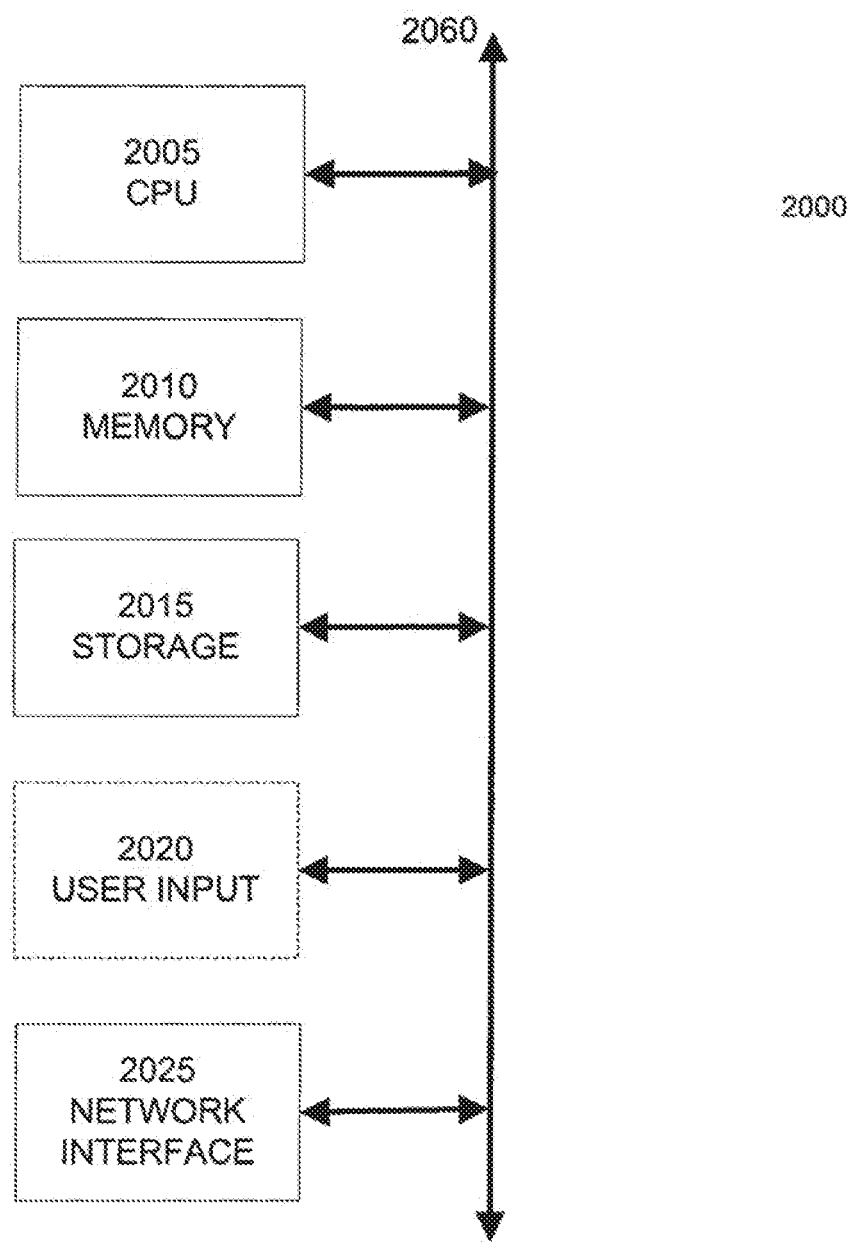
FIG. 8 illustrates an example computer system suitable for implementing techniques described in this paper.

FIG. 8 illustrates a computer system suitable for implementing techniques described in this paper. FIG. 8 is a block diagram of a computer system 2000, such as a personal computer or other digital device, suitable for implementing techniques described in this paper. The computer system 2000 may or may not include dedicated networking devices, such as wireless access points, network switches, hubs, routers, hardware firewalls, network traffic optimizers and accelerators, network attached storage devices, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

The specification and drawings describe examples. Combinations, sub-combinations, deletions, variations, and applications of the above disclosed techniques can be considered within the spirit and scope of this paper. Combinations of blocks, additions of new blocks, re-arrangement of blocks, and the like are contemplated in various implementations of the techniques described in this paper. Various modifications and changes can be made without departing from the broader spirit and scope of the invention as set forth in the claims.

What is claimed:

1. A method, comprising:
    detecting, at a first wireless access point, a wireless client attempting to access network services through the first wireless access point;
    determining whether predictive roaming information indicating a home subnet associated with the wireless client is stored in a current subnet comprising the first wireless access point, wherein the current subnet is different from the home subnet;
    in response to the predictive roaming information not being stored in the current subnet, sending a broadcast query message to one or more subnets different from the current subnet;
    in response to receiving a response to the broadcast query message, determining that the one of the one or more subnets corresponds to the home subnet associated with the wireless client;
    establishing a tunnel from the current subnet to a home agent in the home subnet, wherein the network services are provided to the wireless client through the home agent;
    determining whether a duration during which the wireless client is idle has reached a predetermined threshold; and
    in response to the duration reaching the predetermined threshold, disabling the tunnel.

2. The method of claim 1, further comprising in response to the duration reaching the predetermined threshold, assigning an IP address associated with the current subnet to the wireless client.

3. The method of claim 1, wherein a wireless communication coverage of the current subnet does not overlap with a wireless communication coverage of the home subnet.

4. The method of claim 1, wherein the current subnet comprises a second wireless access point serving as a home agent of the current subnet, and wherein the second wireless access point determines whether the predictive roaming information is stored in the current subnet.

5. The method of claim 1, wherein the first wireless access point does not serve as a home agent of the current subnet, and wherein the first wireless access point caches the predictive roaming information.

6. The method of claim 1, wherein the tunnel is established from the first wireless access point to the home agent in the home subnet.

7. The method of claim 1, wherein the tunnel is established from a home agent of the current subnet different from the first wireless access point to the home agent in the home subnet.

8. The method of claim 1, wherein the tunnel is established as part of layer 2 routing.

9. The method of claim 1, wherein the predictive roaming information comprises connection information used to provide the wireless client access to the network services.

10. A system, comprising:
    one or more processors;
    memory storing applications, when executed by the one or more processors, configured to cause the one or more processors to perform operations, the operations comprising:
        detecting, at a first wireless access point, a wireless client attempting to access network services through the first wireless access point;
        determining whether predictive roaming information indicating a home subnet associated with the wireless client is stored in a current subnet comprising the first wireless access point, wherein the current subnet is different from the home subnet;
        in response to the predictive roaming information not being stored in the current subnet, sending a broadcast query message to one or more subnets different from the current subnet;
        in response to receiving, a response to the broadcast query message, determining that the one of the one or more subnets corresponds to the home subnet associated with the wireless client;
        establishing a tunnel from the current subnet to a home agent in the home subnet, wherein the network services are provided to the wireless client through the home agent;
        determining whether a duration during which the wireless client is idle has reached a predetermined threshold; and
        in response to the duration reaching predetermined threshold, disabling the tunnel.

11. The system of claim 10, wherein the operations further comprise in response to the duration reaching the predetermined threshold, assigning an IP address associated with the current subnet to the wireless client.

12. The system of claim 10, wherein a wireless communication coverage of the current subnet does not overlap with a wireless communication coverage of the home subnet.

13. The system of claim 10, wherein the current subnet comprises a second wireless access point serving as a home agent of the current subnet, and wherein the second wireless access point determines whether the predictive roaming information is stored in the current subnet.

14. The system of claim 10, wherein the first wireless access point does not serve as a home agent of the current subnet, and wherein the first wireless access point caches the predictive roaming information.

15. The system of claim 10, wherein the tunnel is established from the first wireless access point to the home agent in the home subnet.

16. The system of claim 10, wherein the tunnel is established from a home agent of the current subnet different from the first wireless access point to the home agent in the home subnet.

17. The system of claim 10, wherein the tunnel is established as part of layer 2 routing.

18. The system of claim 10, wherein the predictive roaming information comprises connection information used to provide the wireless client access to the network services.

19. Computer-readable media (CRM) comprising computer instructions, where upon execution of the computer instructions by one or more processors of a first wireless access point, cause the one or more processors to:
    detect, at the first wireless access point, a wireless client attempting to access network services through the first wireless access point;
    determine whether predictive roaming information indicating a home subnet associated with the wireless client is stored in a current subnet comprising the first wireless access point, wherein the current subnet is different from the home subnet;

in response to the predictive roaming information not being stored in the current subnet, send a broadcast query message to one or more subnets different from the current subnet;

in response to receiving a response to the broadcast query message, determine that the one of the one or more subnets corresponds to the home subnet associated with the wireless client;

establish a tunnel from the current subnet to a home agent in the home subnet, wherein the network services are provided to the wireless client through the home agent;

determine whether a duration during which the wireless client is idle has reached a predetermined threshold; and in response to the duration reaching the predetermined threshold, disable the tunnel.

20. The CRM of claim 19, wherein the first wireless access point does not serve as a home agent of the current subnet, and wherein the first wireless access point caches the predictive roaming information.

* * * * *